(12) United States Patent
Lopes

(10) Patent No.: US 6,544,336 B1
(45) Date of Patent: Apr. 8, 2003

(54) APPARATUS FOR A HIGH EFFICIENCY SPRAY SYSTEM

(75) Inventor: Fernando Luis De Souza Lopes, Richmond (CA)

(73) Assignee: Creo Inc., Burnaby (CA)

( * ) Notice: Subject to any disclaimer, the term of this patent is extended or adjusted under 35 U.S.C. 154(b) by 45 days.

(21) Appl. No.: 09/580,621

(22) Filed: May 30, 2000

(51) Int. Cl.⁷ .................... B05B 7/16; B05B 15/02; B05C 5/00

(52) U.S. Cl. .................... 118/302; 118/612; 118/50; 239/139; 239/424

(58) Field of Search .................... 118/302, 612, 118/50, 52, 54; 239/139, 424, 423, 418

(56) References Cited

U.S. PATENT DOCUMENTS

| | | | | |
|---|---|---|---|---|
| 2,980,786 A | * | 4/1961 | Chilton | 239/135 |
| 4,132,357 A | * | 1/1979 | Blackinton | 239/424 |
| 4,899,516 A | * | 2/1990 | Krieger et al. | 53/306 |
| 5,100,060 A | | 3/1992 | Haferkorn | 239/337 |
| 5,165,605 A | | 11/1992 | Morita et al. | 239/296 |
| 5,285,967 A | * | 2/1994 | Weidman | 239/80 |
| 5,344,073 A | * | 9/1994 | Waryu et al. | 239/1 |
| 5,524,656 A | * | 6/1996 | Konarski et al. | 134/198 |
| 6,291,605 B1 | * | 9/2001 | Freeman et al. | 526/88 |

* cited by examiner

Primary Examiner—Richard Crispino
Assistant Examiner—Yewebdar T Tadesse
(74) Attorney, Agent, or Firm—Oyen Wiggs Green Mutala

(57) ABSTRACT

Several components are used in combination to effect an apparatus for a spray system, which improves the transfer characteristics and efficiency of polymer applied to the surface of a printing plate. In accordance with this invention, the apparatus comprises: a nozzle for spraying a solid stream of polymer, a circumferential conduit surrounding the polymer spray that carries heated, high-pressure air, which heats, atomizes and improves the transfer efficiency of the polymer, a mixer that allows the mixing of the polymer's constituent reagents immediately prior to the polymer entering the spray nozzle, a fast shut-off valve that allows precision control of the spray nozzle's output, a shroud equipped with vacuum to remove and recycle "overspray", and a cleaning arm, equipped with a vacuum, that may be activated to clean unused polymer from the components of the nozzle, and to prime the spray nozzle with fresh polymer.

22 Claims, 3 Drawing Sheets

APPARATUS FOR A HIGH EFFICIENCY SPRAY SYSTEM

FIELD OF THE INVENTION

The invention relates to pressurized spray systems. Specifically, the invention relates to a spray system used to apply a polymer to the surface of a printing plate.

BACKGROUND OF THE INVENTION

In general, the surface of a commercial printing plate is coated with reactive materials. The layer of reactive material applied to the plate is capable of being imaged (frequently the imaging process involves laser light) and is also capable of retaining the image on the plate. The image bearing plate may subsequently be used in a printing press to impart the image onto a printing surface. Recently, "direct-to-press" technology has permitted printing plates to be imaged directly on the printing press. The reactive materials used to coat printing plates are typically light or heat sensitive polymers, which are sprayed onto the printing plate through some sort of pressurized spray nozzle. Throughout this application, the word "polymer" is used to describe the reactive material sprayed on a printing plate. However, the word "polymer" should not be construed in a limiting sense, as the invention would apply to any material used to coat printing plates. In addition, the spray nozzle that is the subject of this invention may be used to temporarily spray other materials used in plate preparation, such as cleaning agents, stripping agents, water and other chemicals. For simplicity, use of the word "polymer" should also be understood to incorporate these other materials temporarily sprayed on a printing plate surface.

Many types of spray nozzles exist in the prior art and they disclose various techniques for spraying different kinds of materials. U.S. Pat. No. 5,360,165 discloses a spray paint nozzle with a conical shroud, used to contain the sprayed paint, and a "recirculation mechanism", used to reclaim leftover paint that does not adhere to the target surface. U.S. Pat. No. 5,441,201 discloses a liquid spray device for use in agricultural applications that is equipped with a shroud and uses hot air to break up conical sheets of sprayed liquid into droplets. U.S. Pat. No. 5,285,967 teaches a high velocity thermal spray gun for spraying high temperature melted powdered plastics, which also involves a shroud and a mechanism for cooling the melted powder down prior to reaching the target. U.S. Pat. No. 4,218,019 involves an "air shroud", which contains the sprayed liquid and directs it toward the target. Finally, U.S. Pat. No. 5,057,342 discloses an apparatus for improving the feathering of the output from an "airless" spray nozzle. While these prior art inventions teach techniques that may be generally applicable to spray nozzles, none of them address concerns particularly related to the application of polymer to the surface of printing plates.

In order to ensure the quality of the printed image the application of the polymers to a printing plate must be "complete" (i.e. a coating on the entire imaging area of the plate) and "uniform" (i.e. a consistently even layer in all imaging areas of the plate). An additional consideration that is important to the spraying of polymers onto printing plates is the actual transfer efficiency of the spraying process. As the polymers used on printing plates are expensive, it is obviously beneficial to maximize the amount of polymer transferred from the nozzle to the plate and minimize the amount of wastage. These criteria of completeness, uniformity and transfer efficiency are most easily achieved when the polymer is sprayed in an atomized mist, in a fashion similar to commercially available "spray-paint" canisters. Unfortunately, the molecules of polymers used on commercial printing plates tend to become entangled with one another, making the polymer difficult to atomize, substantially reducing the effectiveness of conventional low-pressure spraying techniques. Accordingly, a spraying apparatus is required to obtain a complete, uniform coating of relatively entangled polymer on a printing plate with a high transfer efficiency.

In addition to the above requirements, the spraying of polymers onto printing plates involves a number of additional complications. Typically, the polymers used on printing plates are comprised of two or more reagents that must be mixed prior to spraying. The mixing process initiates a chemical reaction, similar to that of epoxy resin, which causes the polymer to cure and harden. Consequently, the mixing must be done immediately prior to spraying to avoid premature curing. In addition, any excess polymer that is mixed but not sprayed is wasted because it cures and is no longer sprayable. As such, an apparatus is required to mix the polymer's constituent reagents immediately prior to spraying in a manner that will minimize the amount of polymer that is wasted by being mixed, but not sprayed.

Excess wastage is also a problem when applying polymer to a plate that is already mounted on the drum of a printing press. This process is common in today's "direct-to-press" technology. Since part of the drum surface (referred to in this application as the "plate-mounting gap" or "gap") is used to mount the plate and does not require a coating of polymer, any polymer sprayed into the plate-mounting gap is wasted. As such, an apparatus is required to minimize the amount of polymer sprayed into the plate-mounting gap.

A final consideration is the need for cleaning of the spray nozzle apparatus. If the polymer collects in the nozzle mechanism, it may cure and impair the functionality of the device. Consequently, an apparatus is required to facilitate the efficient cleaning of the spray apparatus.

SUMMARY OF THE INVENTION

The invention herein disclosed concerns an apparatus for a spray system operative to spray a substantially liquid polymer onto the surface of a printing plate. A fluid nozzle receives the polymer from the internal features of the spray system and ejects the polymer in a substantially liquid state. Surrounding the fluid nozzle, there is a conduit, which carries heated, high pressure air. The air heats the polymer, prior to its ejection from the fluid nozzle. The conduit also ejects the heated air, in such a manner that the air physically interacts with, and atomizes, the substantially liquid polymer, creating a mist of polymeric matter. The heating of the polymer by the air in the conduit makes it easier to atomize the polymer.

The apparatus also comprises a solid shroud surrounding the fluid nozzle and extending toward the printing plate. The shroud is equipped with at least one aperture attached to a vacuum source, such that the shroud, aperture and vacuum source act in combination to remove excess polymer that does not adhere to the printing plate. A fast shut-off valve, which controls the ejection of the polymer from the fluid nozzle, is located proximate to the fluid nozzle. In this manner, the amount of wasted polymer due to non-required ejection is minimized. The apparatus may also include a mixer operative to thoroughly and homogeneously mix the polymer from a number of constituent reagents. As with the shut-off valve, the mixer is located proximate to the fluid nozzle, so as to minimize the amount of the polymer, which is mixed, but not ejected.

Finally, the apparatus may comprise a cleaning mechanism. The cleaning system itself consists of a plurality of switches, which arrest the flow of the constituent reagents (if required) and permit at least one cleaning fluid to flow through (and simultaneously clean) the mixer, fast shut-off valve and fluid nozzle. The cleaning system also comprises a cleaning arm equipped with a source of vacuum suction. The cleaning arm moves, by either translation or rotation, between an active position (directly external to the fluid nozzle) and a non-intrusive position (out of the way, so as not to interfere with the ejected polymer). During cleaning, the cleaning arm is in the active position, directly external to the fluid nozzle. In this manner, the cleaning arm collects cleaning fluid, left-over polymer and any other materials ejected from the fluid nozzle.

Advantageously, the aperture located in the shroud may be further operative in combination with the vacuum source, to remove excess polymer (i.e. polymer that did not adhere to the target surface) from a vicinity of the fluid nozzle. In this manner, the excess polymer may be recycled.

Preferably, the fast shut-off valve may be located within the actual fluid nozzle.

Preferably, the mixer may further comprise a substantially cylindrical and hollow mixing column, which receives the constituent reagents from external reservoirs. The mixer may also include a substantially cylindrical mixing shaft, concentrically located within the mixing column. Finally, the mixer may also comprise a motor, which rotates the mixing shaft within the mixing column, so as to thoroughly and homogeneously mix the constituent reagents in a region between the exterior surface of the mixing shaft and the interior surface of the mixing column.

Advantageously, the exterior surface of the mixing shaft may be patterned, so as to improve the mixing process and to provide a suction force, which draws the constituent reagents into the mixing column.

The movement of the cleaning arm between the active position (i.e. directly external to the fluid nozzle) and the non-intrusive position may be accomplished by an external electro-mechanical switch or even by the vacuum suction source within the cleaning arm.

Advantageously, the plurality of switches and the cleaning arm, which comprise the cleaning mechanism, may be independently operative.

Preferably, the cleaning system may be further operative to assist in priming the spray system after cleaning. During a priming operation, the plurality of switches in the cleaning system may be operative to arrest a flow of the cleaning fluid (if required) and to permit a flow of the constituent reagents and polymer instead. The constituent reagents flow through the mixer and the polymer flows through both the fast shut off valve and the fluid nozzle. The cleaning arm may then be positioned directly external to the fluid nozzle and may be used to collect the substantially liquid polymer, any left-over cleaning fluid and any other materials that are ejected from the fluid nozzle, until the spray system is sufficiently primed.

Further advantages of the invention will become apparent when considering the drawings in conjunction with the detailed description.

DESCRIPTION OF THE PREFERRED EMBODIMENT

Figure 1:
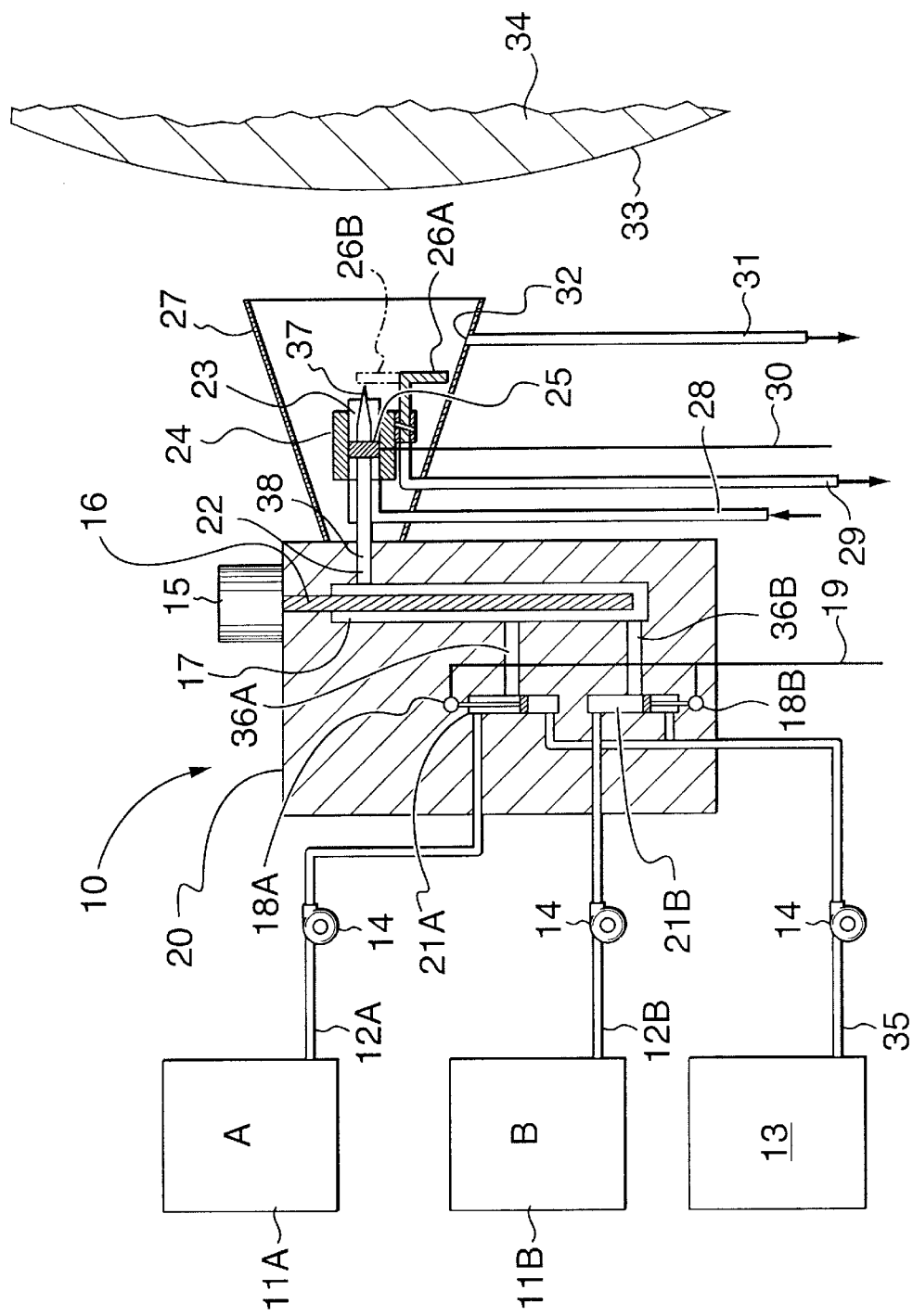
FIG. 1 is a schematic view of the entire apparatus as disclosed herein.

FIG. 1 shows apparatus according to the present invention. The apparatus comprises a nozzle system 10 for applying polymer to a printing plate 33. The printing plate 33 may be affixed to the surface of a cylindrical drum 34, but the invention is also applicable when the plate 33 is in a flat orientation (not shown).

Typically, a polymer is made out of more than one reagent. Generally, any number of reagents may be used, but for the purposes of this disclosure, FIG. 1 displays only two reagents A and B, which are housed in reservoirs 11A and 11B respectively. The liquid reagents A and B are forced into conduits 12A and 12B respectively by pumps 14 and directed towards the manifold 20. In general, the pumping of reagents A and B are suspensions or dispersions (rather than true solutions). In this scenario, the reagents A and B must be circulating within the system to avoid settling. The fluid displacement of reagents A and B may also be accomplished by gravity, pressure, vacuum, or other means. Once inside the manifold 20, the reagents A and B encounter switches 21A and 21B, which are activated by solenoid actuators 18A and 18B. Solenoid actuators 18A and 18B are controlled by the signal 19, originating from the control logic (not shown). In the state depicted in FIG. 1, the solenoid actuators 18A and 18B are both positioned so as to let the reagents A and B pass through switches 21A and 21B into conduits 36A and 36B. Switches 21A and 21B are important because they control the amount of reagents A and B that reach the mixer column 17. Once the reagents A and B are mixed, they must be used or they will cure and be wasted. Consequently, switches 21A and 21B are important because they reduce wastage and increase the overall transfer efficiency of the system.

From conduits 36A and 36B, reagents A and B enter the mixer column 17, where they are mixed by the rotation of the mixer shaft 16. As motor 15 rotates the mixer shaft 16, the reagents A and B are mixed while being simultaneously drawn up the mixer column 17. Once the newly mixed polymer 38 reaches the top of the mixer column 17, it exits through conduit 22 toward the nozzle head 24. At the same time, heated air at high-pressure (not shown) is forced through conduit 28. The phrases "high-pressure" and "low-pressure" are used frequently herein and should be interpreted in a relative (rather than absolute) context. The heated air in conduit 28 surrounds the newly mixed polymer 38 in conduit 22, warming it and reducing its viscosity. The mixed polymer 38 encounters the quick shut-off valve 25 in the nozzle head 24. The quick shut-off valve 25 is controlled by signal 30 (originating from the control logic (not shown)) and is used to cut off the flow of mixed polymer 38 into nozzle head 24. Once past the quick shut-off valve 25, the mixed polymer 38 is ejected from the nozzle tip 37 in substantially liquid form and directed towards the printing plate 33.

Figure 2:
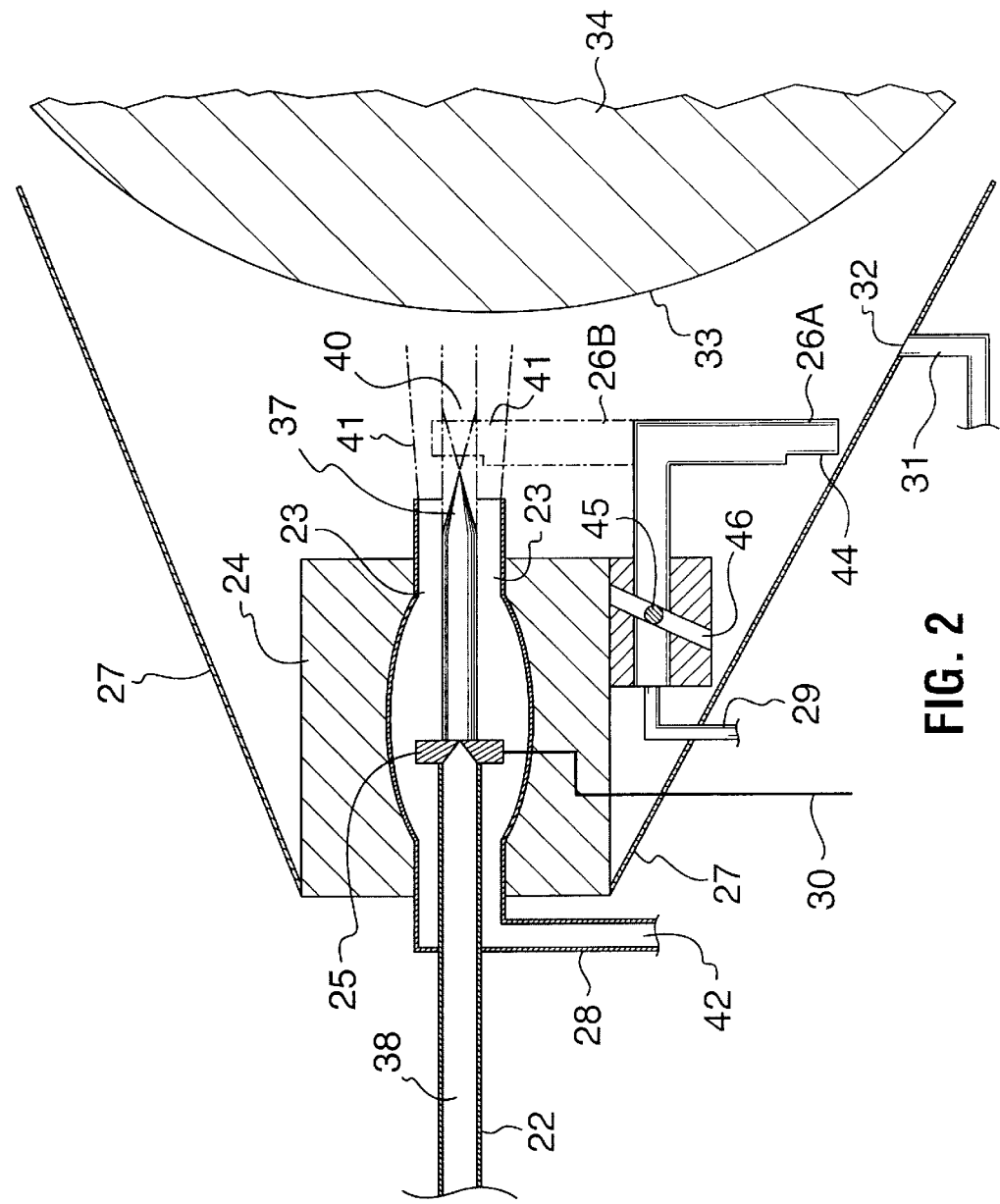
FIG. 2 is a close up cross-sectional view of the nozzle head and the shroud.

Referring to FIG. 2, the nozzle head 24 is depicted in more detail. The mixed polymer 38 travels from the mixer (not shown) to the nozzle head 24 via conduit 22. Simultaneously, heated air 42 at high-pressure is forced through conduit 28 into the nozzle head 24. As mentioned earlier, in the nozzle head 24 the heated air 42 in conduit 28 is brought into proximity of the mixed material 38 in conduit 22, heating the mixed polymer 38. The heating of the mixed polymer 38 immediately prior to its ejection from the nozzle head 24 provides several advantages. Most notably, heating "loosens" the entangling of polymer molecules, making it easier to atomize the mixed polymer 38 after ejection. In addition, for some highly reactive polymers, heating the mixed polymer 38 immediately prior to ejection is required (particularly when the mixed polymer 38 is highly reactive), because the rate of the cross-linking (curing) reaction of the mixed polymer 38 is generally increased with the addition of heat. Consequently, if the mixed polymer 38 is heated too early, the curing reaction would take place prior to ejection from the nozzle head 24, and any prematurely cured polymer would be wasted.

In the nozzle head 24, the mixed polymer 38 encounters the quick shut-off valve 25. The quick shut-off valve 25 and its control signal 30 are functionally important, because they can be configured, so as to control the flow of mixed polymer 38 through the nozzle tip 37 and substantially reduce the amount of mixed polymer 38 sprayed into the plate-mounting gap (not shown). As a matter of system design, it is important to locate the quick shut-off valve 25 as close as possible to the nozzle tip 37. In this manner, when the shut-off valve 25 is activated, the amount of polymer 38 left "downstream" of the activated shut-off valve 25 is reduced. Minimizing the polymer 38 left downstream of the shut off valve 25 is important, because such material 38 may continue to be ejected from the nozzle tip 37 into the plate-mounting gap, creating waste. Thus, the location and control of the quick shut-off valve 25 increase the overall system transfer efficiency by reducing the wastage of mixed polymer 38.

The high-pressure heated air 42, which arrives at the nozzle head 24 via conduit 28 performs a number of secondary functional roles. After passing through the nozzle head 24, the high-pressure, heated air 42 is ejected from the aperture 23 forming spray profile 41. The heated air 42 is ejected at high pressure so that the velocity of the air stream at the aperture 23 is at relatively high speed. However, the overall flow rate of the air is small. While the heated air 42 is ejected from aperture 23, the mixed polymer 38 is simultaneously ejected in substantially liquid form from nozzle tip 37. The heated air stream 41 performs the function of atomizing the mixed polymer 38, forming a fine mist of polymer droplets (not shown). As the air stream 41 interacts with mixed polymer 38, its speed is substantially reduced, so that by the time the air 41 and the polymer droplets reach the printing plate 33, the cloud of polymer droplets and the heated air stream 41 have a relatively low speed. The low speed of the air 41 and the polymer droplets provide excellent adhesion of the polymer droplets to the plate 33, because the low speed reduces the amount of "bounceback" of the polymer droplets. In this manner, the ejected air stream 41 reduces the amount of oversprayed polymer (i.e. excess polymer resulting from "bounceback" or that otherwise does not adhere to the plate 33)(not shown) and increases the overall system transfer efficiency.

The amount of heated high pressure air 42 ejected from aperture 23 into the air stream 41 has a lower limit determined by the need to adequately atomize the substantially liquid mixed polymer 38. However, increasing the amount of air in the air stream 41 can not be done without limitation, because increases in air flow 41 cause an increase in the speed and turbulence imparted on the atomized mixed polymer droplets, and a corresponding increase in the amount of "bounceback" of the polymer droplets. That is, the higher the pressure of the air in the air stream 41, the more overspray and the lower the overall system transfer efficiency. This phenomenon illustrates the advantage of pre-heating the mixed polymer 38 in the nozzle head 24, because pre-heating makes it easier to atomize the substantially mixed polymer 38, reducing the amount of high pressure air 42 required in the air stream 41. Consequently, the invention depends on selecting the correct flow of heated high pressure air 42, in the air stream 41, so as to fully atomize the substantially liquid mixed polymer 38, while simultaneously effecting a controlled transfer of the polymer droplets, generating less overspray and "bounceback" and maximizing the overall system transfer efficiency.

FIG. 2 also displays the shroud 27, which encases the spray nozzle head 24 in a conical manner. The shroud 27 is equipped with a hole 32 leading to conduit 31. Conduit 31 is attached to a source of negative pressure (i.e. a vacuum source) (not shown). The shroud 27 in combination with the vacuum, the hole 32, and the conduit 31, is useful to help remove overspray.

The excess overspray, or polymer (not shown) can be immediately reclaimed and possibly recycled. Although FIG. 2 depicts only one hole 32, there may be a plurality of holes in the shroud 27, each attached to a vacuum source and each functioning to remove oversprayed polymer that does not adhere to the target surface 33. In this manner, the shroud 27 and aperture 32 help to reduce the wastage of polymer 38 and also prevents oversprayed polymer from accumulating, and possibly curing, in undesired areas.

Figure 3:
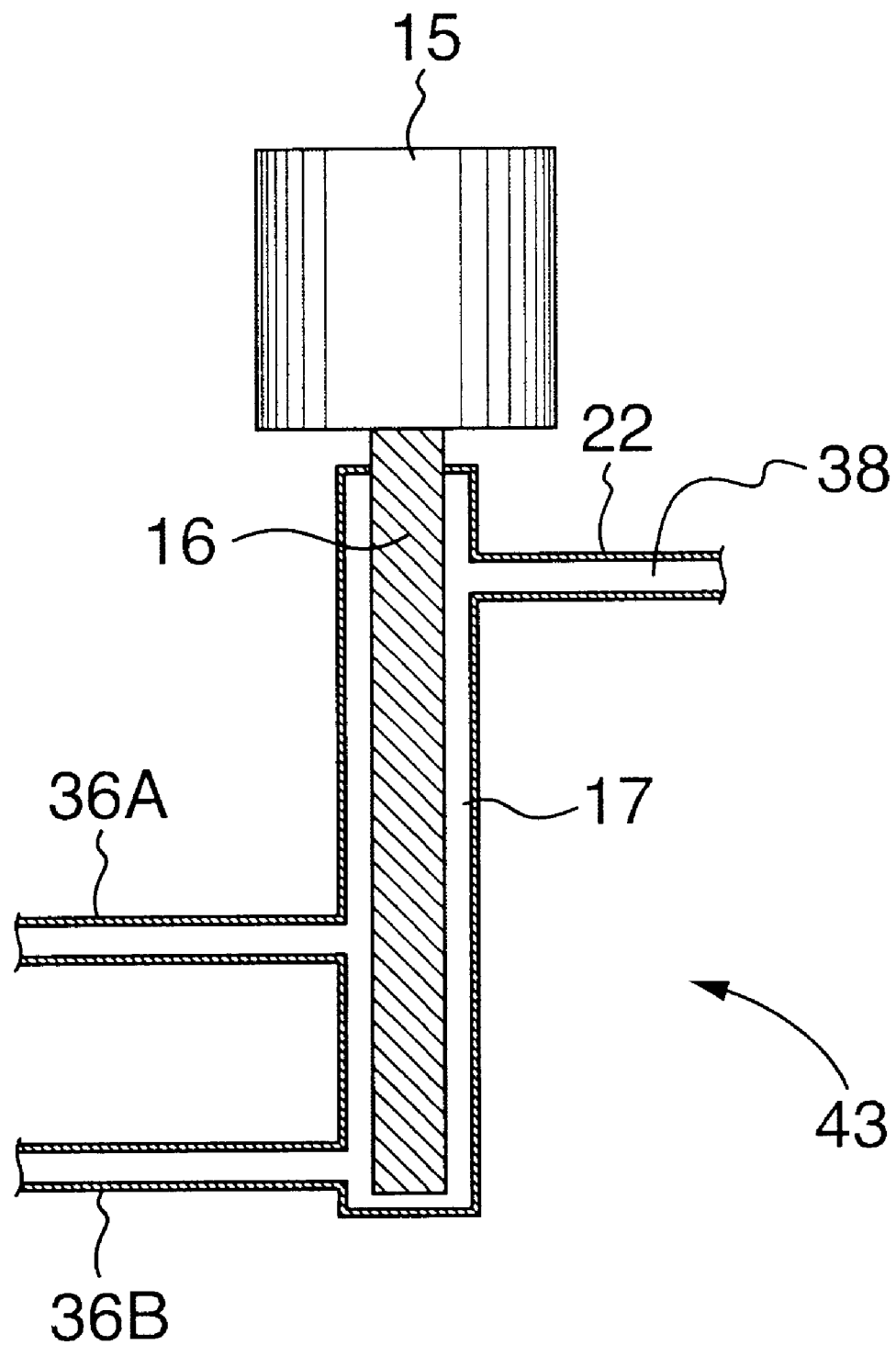
FIG. 3 depicts an implementation of the mixing process and apparatus according to the present invention.

Referring to FIG. 3, an implementation of the mixer 43 is depicted in accordance with the present invention. Typically, the mixer 43 will be located in the manifold (not shown in FIG. 3, see 20 in FIG. 1). The basic components of the mixer 43 are a motor 15, a mixing shaft 16 and a mixing column 17. Using pumps (not shown in FIG. 3) the two reagents A and B (not shown in FIG. 3) are introduced to the mixing column 17 via conduits 36A and 36B. Although the depiction in FIG. 3 shows only two reagents, there is no general limitation on the number of reagents and 3 or more may be common. As the pressurized reagents A and B enter the mixing column 17, the motor 15 rotates the mixing shaft 16 (typically btw 1000 and 5000 RPM) in such a manner that the reagents A and B are thoroughly mixed as they travel up the mixing column 17 toward the exit conduit 22. The rotational speed of the mixing shaft 16 is a function of the mixing column 17, size, and the flow of reagents A and B. By the time that the reagents A and B reach conduit 22, they have become mixed polymer 38. Additionally, the mixing shaft 16 may be patterned with some features, such as spiral grooves that help to mix the reagents A and B or that help to pump the reagents through the mixer.

The mixer embodiment 43 described above has several advantageous features. In addition to the mixer 43 providing homogeneous mixtures, the relatively thin column 17 minimizes the amount of trapped material and the overall design of the mixer 43 facilitates easy cleaning.

Referring back to FIG. 1, the spray nozzle 10 may be configured in a cleaning mode. In such a state, logic signal 19 is used to trigger relays 18A and 18B, which activate switches 21A and 21B, causing them to block the flow of reagents A and B and facilitating the flow of cleaning fluid 13, which is pumped (by pump 14) through conduit 35. As with the reagents A and B, the pump 14 is not necessary and the fluid flow may be provided by any means, including gravity, pressure, or vacuum. In general, the cleaning fluid 13 may be some combination of water and/or other solvents.

In addition, switches 21A and 21B may be implemented by any other means of diverting liquid and should not be limited to relay activated switches.

After flowing through the switches 21A and 21B, the cleaning fluid 13 is conducted to the mixer 43 via conduits 36A and 36B, ending up in the mixing column 17. Once in the mixing column 17, the cleaning fluid 13 is subjected to the same mixing action as reagents A and B in a typical spraying application, which facilitates complete coverage and thorough cleaning of the interior of mixer 43.

After cleaning the mixer 43, the cleaning fluid 13 exits the mixing column 17 through conduit 22 and travels towards the nozzle head 24. The cleaning fluid 13 cleans conduit 22, the interior of nozzle head 24 and nozzle tip 37, prior to being ejected from the spraying device.

Referring back to FIG. 2, the invention provides for an additional cleaning mechanism comprising cleaning arm 26A, which may be used independently or in conjunction with the cleaning fluid 13. During spraying operation, cleaning arm 26A is in the position indicated by solid lines, safely out of the way of the spray profile 40 of the mixed polymer 38. However, in cleaning mode operation, cleaning arm 26A is rotated to position 26B indicated by dotted lines, so that collector 44 is positioned over the nozzle tip 37. Vacuum (not shown) is applied to conduit 29 and creates negative pressure at the collector 44. The vacuum action is used to suck remaining particles of wasted polymer and other materials from the nozzle head 24 and the nozzle tip 37 into collector 44. If the cleaning arm 26A is used in conjunction with cleaning fluid 13, then the vacuum can be used to take up (into collector 44) all of the ejected cleaning fluid 13, along with dissolved polymer and other contaminants from the mixer 43 and the manifold 20.

The movement of the cleaning arm 26A from the position indicated by solid lines to the position 26B indicated by dotted lines and back may be implemented by an independent motor (not shown) or, alternatively, by the action of the vacuum in conduit 29. When vacuum is turned on in conduit 29, it exerts negative pressure on the base of cleaning arm 26A, pulling pin 45 around the groove 46 and causing the cleaning arm 26A to rotate to the position 26B indicated by the dotted lines. The cleaning arm 26A may be spring loaded so as to return to the position indicated by solid lines when the vacuum in conduit 29 is shut off. In general, the invention does not depend on the mechanism by which cleaning arm 26A is activated. As a result, the invention should be understood to incorporate any known methods of causing the cleaning arm 26A to move between position indicated by the solid lines and position 26B indicated by the dotted lines.

In addition to performing a cleaning function, the cleaning mechanism comprising cleaning arm 26A may be used to prime the nozzle after a cleaning operation and prior to the start of a new spraying operation. Priming may be necessary to purge the system of excess cleaning fluid 13. Priming is accomplished by running the nozzle using the desired reagents A and B and operating the cleaning arm 26A in the position 26B indicated by dotted lines so that when the vacuum (not shown) is applied to conduit 29, the mixture of residual cleaning solution 13 and mixed polymer 38 is collected by collector 44. Priming the nozzle is performed until substantially all of the residual cleaning fluid 13 is purged from the system and the nozzle ejects substantially pure mixed polymer 38. The cleaning arm 26A can then be returned to its inactive position indicated by solid lines and the system is primed for spraying.

It should be understood that the above description is intended for illustrative purposes only, and is not intended to limit the scope of the present invention in any way. Those skilled in the art will appreciate that various modifications can be made to the embodiments discussed above without departing from the spirit of the present invention.

What is claimed is:

1. An apparatus for a spray system operative to spray a substantially liquid polymer onto a surface of a printing plate, said apparatus comprising:

(a) a fluid nozzle operative to receive said polymer and eject it in a substantially liquid state;

(b) a conduit surrounding said fluid nozzle and carrying heated air at high pressure, said heated air being operative to heat said polymer, prior to ejection of said polymer from said fluid nozzle, said conduit being further operative to eject said heated air, in such a manner that said heated air physically interacts with and atomizes said substantially liquid polymer, creating a mist of polymeric matter;

(c) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate;

(d) a fast shut-off valve located proximate to said fluid nozzle, said fast shut-off valve being operative to control said ejection of said polymer from said fluid nozzle and to minimize an amount of polymer wasted by ejecting said polymer when it is not required;

(e) a mixer operative to thoroughly and homogeneously mix said polymer from a plurality of constituent reagents, said mixer being located proximate to said fluid nozzle, so as to minimize an amount of said polymer, which is mixed, but not ejected from said fluid nozzle; and (f) a cleaning mechanism, which further comprises:

(i) a plurality of switches, which are operative to arrest a flow of said constituent reagents, if required, and to permit at least one cleaning fluid to flow through, and simultaneously clean said mixer, fast shut-off valve and fluid nozzle; and (ii) a cleaning arm, equipped with a source of vacuum suction, said cleaning arm being operative to move via one of: translation and rotation, between a position directly external to said fluid nozzle and a non-intrusive position, during cleaning, said cleaning arm being positioned directly external to said fluid nozzle and said cleaning arm being operative to collect cleaning fluid, left-over polymer and any other materials ejected from said fluid nozzle, and during use, said cleaning arm being positioned in said non-intrusive position, so as not to interfere with said ejected polymer.

2. An apparatus according to claim 1, wherein said aperture located in said shroud is further operative in combination with said vacuum source, to remove said excess polymer from a vicinity of said fluid nozzle, so that said excess polymer may be recycled.

3. An apparatus according to claim 1, wherein said fast shut-off valve is located within said fluid nozzle.

4. An apparatus according to claim 1, wherein said mixer further comprises:

(a) a substantially cylindrical and hollow mixing column, which is operative to receive said constituent reagents from external reservoirs;
(b) a substantially cylindrical mixing shaft, concentrically located inside said mixing column; and
(c) a motor, which is operative to rotate said mixing shaft within said mixing column, so as to thoroughly and homogeneously mix said constituent reagents in a region between an exterior surface of said mixing shaft and an interior surface of said mixing column.

5. An apparatus according to claim 4, wherein said exterior surface of said mixing shaft is patterned, so as to improve said mixing and to provide a suction force, which draws said constituent reagents into said mixing column.

6. An apparatus according to claim 1, wherein movement of said cleaning arm between said position directly external to said fluid nozzle and said non-intrusive position is accomplished by one of: an external electro-mechanical switch and said vacuum suction source within said cleaning arm.

7. An apparatus according to claim 1, wherein said plurality of switches and said cleaning arm, which comprise said cleaning mechanism, are independently operative.

8. An apparatus according to claim 1, wherein said cleaning mechanism is further operative to assist in priming said spray system after cleaning,
during priming, said plurality of switches being operative to arrest a flow of said cleaning fluid if required, to permit a flow of said constituent reagents through said mixer, and to permit a flow of said polymer through said fast shut off valve and fluid nozzle, and
said cleaning arm being positioned directly external to said fluid nozzle and being operative to collect said substantially liquid polymer, any left-over cleaning fluid and any other materials ejected from said fluid nozzle until said spray system is sufficiently primed.

9. An apparatus for a spray system operative to a spray a substantially liquid polymer onto a surface of a printing plate, said apparatus comprising:
(a) a fluid nozzle operative to receive said polymer and eject it in a substantially liquid state;
(b) a conduit surrounding said fluid nozzle and carrying heated air at high pressure, said heated air being operative to heat said polymer, prior to ejection of said polymer from said fluid nozzle,
said conduit being further operative to eject said heated air, in such a manner that said heated air physically interacts with and atomizes said substantially liquid polymer, creating a mist of polymeric matter;
(c) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate; and
(d) a fast shut-off valve located proximate to said fluid nozzle,
said fast shut-off valve being operative to control said ejection of said polymer from said fluid nozzle and to minimize an amount of polymer wasted by ejecting said polymer when it is not required.

10. An apparatus for a spray system operative to spray a substantially liquid polymer onto a surface of a printing plate, said apparatus comprising:
(a) a fluid nozzle operative to receive said polymer and eject it in a substantially liquid state;
(b) a conduit surrounding said fluid nozzle and carrying heated air at high pressure, said heated air being operative to heat said polymer, prior to ejection of said polymer from said fluid nozzle,
said conduit being further operative to eject said heated air, in such a manner that said heated air physically interacts with and atomizes said substantially liquid polymer, creating a mist of polymeric matter;
(c) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate; and
(d) a mixer operative to thoroughly and homogeneously mix said polymer from a plurality constituent reagents, said mixer being located proximate to said fluid nozzle, so as to minimize an amount of said polymer, which is mixed, but not ejected from said fluid nozzle.

11. An apparatus for a spray system operative to spray a substantially liquid polymer onto a surface of a printing plate, said apparatus comprising:
(a) a fluid nozzle operative to receive said polymer and eject it in a substantially liquid state;
(b) a conduit surrounding said fluid nozzle and carrying heated air at high pressure, said heated air being operative to heat said polymer, prior to ejection of said polymer from said fluid nozzle,
said conduit being further operative to eject said heated air, in such a manner that said heated air physically interacts with and atomizes said substantially liquid polymer, creating a mist of polymeric matter;
(c) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate; and
(d) a cleaning mechanism, which further comprises:
(i) a plurality of switches, which are operative to arrest a flow of constituent reagents used to create said polymer if required, and to permit at least one cleaning fluid to flow through, and simultaneously clean, said fast shut-off valve and fluid nozzle; and
(ii) a cleaning arm equipped with a source of vacuum suction, said cleaning arm being operative to move via one of: translation and rotation, between a position directly external to said fluid nozzle and a non-intrusive position,
during cleaning, said cleaning arm being positioned directly external to said fluid nozzle and said cleaning arm being operative to collect cleaning fluid, left-over polymer and any other materials ejected from said fluid nozzle, and
during use, said cleaning arm being positioned in said non-intrusive position, so as not to interfere with said ejected polymer.

12. An apparatus for a spray system operative to spray a substantially liquid polymer onto a surface of a printing plate, said apparatus comprising:
(a) a fluid nozzle operative to receive said polymer and eject it in a substantially liquid state;
(b) a conduit surrounding said fluid nozzle and carrying heated air at high pressure, said heated air being operative to heat said polymer, prior to ejection of said polymer from said fluid nozzle,
said conduit being further operative to eject said heated air, in such a manner that said heated air physically interacts with and atomizes said substantially liquid polymer, creating a mist of polymeric matter;

(c) a fast shut-off valve located proximate to said fluid nozzle,
said fast shut-off valve being operative to control said ejection of said polymer from said fluid nozzle and to minimize an amount of polymer wasted by ejecting said polymer when it is not required; and (d) a mixer operative to thoroughly and homogeneously mix said polymer from a plurality constituent reagents, said mixer being located proximate to said fluid nozzle, so as to minimize an amount of said polymer, which is mixed, but not ejected from said fluid nozzle.

13. An apparatus for a spray system operative to spray a substantially liquid polymer onto a surface of a printing plate, said apparatus comprising:

(a) a fluid nozzle operative to receive said polymer and eject it in a substantially liquid state;

(b) a conduit surrounding said fluid nozzle and carrying heated air at high pressure, said heated air being operative to heat said polymer, prior to ejection of said polymer from said fluid nozzle,
said conduit being further operative to eject said heated air, in such a manner that said heated air physically interacts with and atomizes said substantially liquid polymer, creating a mist of polymeric matter;

(c) a fast shut-off valve located proximate to said fluid nozzle,
said fast shut-off valve being operative to control said ejection of said polymer from said fluid nozzle and to minimize an amount of polymer wasted by ejecting said polymer when it is not required; and (d) a cleaning mechanism, which further comprises:
(i) a plurality of switches, which are operative to arrest a flow of constituent reagents used to create said polymer if required, and to permit at least one cleaning fluid to flow through, and simultaneously clean, said fast shut-off valve and fluid nozzle; and
(ii) a cleaning arm equipped with a source of vacuum suction, said cleaning arm being operative to move via one of: translation and rotation, between a position directly external to said fluid nozzle and a non-intrusive position,
during cleaning, said cleaning arm being positioned directly external to said fluid nozzle and said cleaning arm being operative to collect cleaning fluid, left-over polymer and any other materials ejected from said fluid nozzle, and
during use, said cleaning arm being positioned in said non-intrusive position, so as not to interfere with said ejected polymer.

14. An apparatus for a spray system operative to spray a substantially liquid polymer onto a surface of a printing plate, said apparatus comprising:

(a) a fluid nozzle operative to receive said polymer and eject it in a substantially liquid state;

(b) a conduit surrounding said fluid nozzle and carrying heated air at high pressure, said heated air being operative to heat said polymer, prior to ejection of said polymer from said fluid nozzle,
said conduit being further operative to eject said heated air, in such a manner that said heated air physically interacts with and atomizes said substantially liquid polymer, creating a mist of polymeric matter;

(c) a mixer operative to thoroughly and homogeneously mix said polymer from a plurality constituent reagents, said mixture being located proximate to said fluid nozzle, so as to minimize an amount of said polymer, which is mixed, but not ejected from said fluid nozzle; and (d) a cleaning mechanism, which further comprises:
(i) a plurality of switches, which are operative to arrest a flow of said constituent reagents if required, and to permit at least one cleaning fluid to flow through, and simultaneously clean, said mixer and fluid nozzle; and
(ii) a cleaning arm equipped with a source of vacuum suction, said cleaning arm being operative to move via one of: translation and rotation, between a position directly external to said fluid nozzle and a non-intrusive position,
during cleaning, said cleaning arm being positioned directly external to said fluid nozzle and said cleaning arm being operative to collect cleaning fluid, left-over polymer and any other materials ejected from said fluid nozzle, and
during use, said cleaning arm being positioned in said non-intrusive position, so as not to interfere with said ejected polymer.

15. An apparatus for a spray system operative to spray a substantially liquid polymer onto a surface of a printing plate, said apparatus comprising:

(a) a fluid nozzle operative to receive said polymer and eject it in a substantially liquid state;

(b) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate;

(c) a fast shut-off valve located proximate to said fluid nozzle,
said fast shut-off valve being operative to control said ejection of said polymer from said fluid nozzle and to minimize an amount of polymer wasted by ejecting said polymer when it is not required; and (d) a mixer operative to thoroughly and homogeneously mix said polymer from a plurality constituent reagents, said mixture being located proximate to said fluid nozzle, so as to minimize an amount of said polymer, which is mixed, but not ejected from said fluid nozzle.

16. An apparatus for a spray system operative to spray a substantially liquid polymer onto a surface of a printing plate, said apparatus comprising:

(a) a fluid nozzle operative to receive said polymer and eject it in a substantially liquid state;

(b) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate;

(c) a fast shut-off valve located proximate to said fluid nozzle,
said fast shut-off valve being operative to control said ejection of said polymer from said fluid nozzle and to minimize an amount of polymer wasted by ejecting said polymer when it is not required; and (d) a cleaning mechanism, which further comprises:
(i) a plurality of switches, which are operative to arrest the flow of the constituent reagents used to create said polymer if required, and to permit at least one cleaning fluid to flow through, and simultaneously clean, said fast shut-off valve and fluid nozzle; and (ii) a cleaning arm equipped with a source of vacuum suction, said cleaning arm being operative to move via one of: translation and rotation, between a position directly external to said fluid nozzle and a non-intrusive position, during cleaning, said cleaning arm being positioned directly external to said fluid nozzle and said cleaning arm being operative to collect cleaning fluid, left-over polymer and any other materials ejected from said fluid nozzle, and during use, said cleaning arm being positioned in said non-intrusive position, so as not to interfere with said ejected polymer.

17. An apparatus for a spray system operative to spray a substantially liquid polymer onto a surface of a printing plate, said apparatus comprising:

(a) a fluid nozzle operative to receive said polymer eject it in a substantially liquid state;

(b) a solid shroud surrounding said fluid nozzle and extending toward said printing plate, said shroud further comprising at least one aperture attached to a vacuum source, said shroud, aperture and vacuum source operative, in combination, to remove excess polymer that does not adhere to said printing plate;

(c) a mixer operative to thoroughly and homogeneously mix said polymer from a plurality constituent reagents, said mixer being located proximate to said fluid nozzle, so as to minimize the amount of said polymer, which is mixed, but not ejected from said fluid nozzle; and (d) a cleaning mechanism, which further comprises:

(i) a plurality of switches, which are operative to arrest a flow of said constituent reagents if required, and to permit at least one cleaning fluid to flow through, and simultaneously clean, said mixer and fluid nozzle; and (ii) a cleaning arm equipped with a source of vacuum suction, said cleaning arm being operative to move via one of: translation and rotation, between a position directly external to said fluid nozzle and non-intrusive position, during cleaning, said cleaning arm being positioned directly external to said fluid nozzle and said cleaning arm being operative to collect cleaning fluid, left-over polymer and any other materials ejected from said fluid nozzle, and during use, said cleaning arm being positioned in said non-intrusive position, so as not to interfere with said ejected polymer.

18. An apparatus for a spray system operative to spray a substantially liquid polymer onto a surface of a printing plate, said apparatus comprising:

(a) a fluid nozzle operative to receive said polymer and eject it in a substantially liquid state;

(b) a fast shut-off valve located proximate to said fluid nozzle, said fast shut-off valve being operative to control said ejection of said polymer from said fluid nozzle and to minimize an amount of polymer wasted by ejecting said polymer when it is not required;

(c) a mixer operative to thoroughly and homogeneously mix said polymer from a plurality constituent reagents, said mixer being located proximate to said fluid nozzle, so as to minimize an amount of said polymer, which is mixed, but ejected from said fluid nozzle; and (d) a cleaning mechanism, which further comprises:

(i) a plurality of switches, which are operative to arrest a flow of said constituent reagents if required, and to permit at least one cleaning fluid to flow through, and simultaneously clean, said mixer, fast shut-off valve and fluid nozzle; and (ii) a cleaning arm equipped with a source of vacuum suction, said cleaning arm being operative to move via one of: translation and rotation, between a position directly external to said fluid nozzle and a non-intrusive position, during cleaning, said cleaning arm being positioned directly external to said fluid nozzle and said cleaning arm being operative to collect cleaning fluid, left-over polymer and any other materials ejected from said fluid nozzle, and during use, said cleaning arm being positioned in said non-intrusive position, so as not to interfere with said ejected polymer.

19. Apparatus for spraying a liquid polymer onto a surface of a printing medium, the apparatus comprising:

a spray nozzle operative to receive the liquid polymer at a first pressure and eject the liquid polymer toward the surface;

a conduit surrounding the spray nozzle, the conduit connected to a source capable of delivering heated air at a second pressure higher than the first pressure;

a shroud surrounding the spray nozzle and extending toward the surface; and, an aperture within the shroud, the aperture connectable to a vacuum source.

20. The apparatus of claim 19 comprising a mixer located proximate to the spray nozzle and adapted to mix the polymer from two or more constituents.

21. The apparatus of claim 20 comprising a fast shut-off valve located to interrupt a flow of the liquid polymer to the spray nozzle.

22. Apparatus for spraying a liquid polymer onto a surface of a printing medium, the apparatus comprising:

a spray nozzle operative to receive the liquid polymer at a first pressure and eject the liquid polymer toward the surface;

a conduit surrounding the spray nozzle, the conduit connected to a source capable of delivering heated air at a second pressure higher than the first pressure;

a shroud surrounding the spray nozzle and extending toward the surface;

an aperture within the shroud, the aperture connectable to a vacuum source;

a mixer located proximate to the spray nozzle and adapted to mix the polymer from two or more constituents; and a cleaning mechanism, which comprises a cleaning arm carrying a source of suction, the cleaning arm movable between a position directly external to the spray nozzle and a retracted position.

* * * * *